United States Patent
Yang

(10) Patent No.: US 6,866,388 B2
(45) Date of Patent: Mar. 15, 2005

(54) PROJECTION DEVICE

(75) Inventor: Liang-Ta Yang, Taipei (TW)

(73) Assignee: Beauty Up Co., Ltd., Taipei Hsein (TW)

( * ) Notice: Subject to any disclaimer, the term of this patent is extended or adjusted under 35 U.S.C. 154(b) by 0 days.

(21) Appl. No.: 10/349,218

(22) Filed: Jan. 21, 2003

(65) Prior Publication Data

US 2003/0137639 A1 Jul. 24, 2003

(30) Foreign Application Priority Data

Jan. 21, 2002 (TW) ........................................ 91100858 A

(51) Int. Cl.⁷ .............................................. G03B 21/00
(52) U.S. Cl. ...................................... 353/70; 353/122
(58) Field of Search .......................... 353/70, 120, 122

(56) References Cited

U.S. PATENT DOCUMENTS

| | | | |
|---|---|---|---|
| 5,343,262 A | * 8/1994 | Park | 353/119 |
| 5,622,419 A | * 4/1997 | Holder et al. | 353/119 |
| 5,639,152 A | * 6/1997 | Nelson | 353/119 |
| 6,190,015 B1 | * 2/2001 | Tsai et al. | 353/101 |
| 6,457,834 B1 | * 10/2002 | Cotton et al. | 353/70 |
| 6,466,369 B1 | * 10/2002 | Maddock | 359/460 |
| 6,568,814 B2 | * 5/2003 | Rodriguez et al. | 353/70 |
| 6,712,477 B2 | * 3/2004 | Idaszak et al. | 353/122 |

\* cited by examiner

*Primary Examiner*—Christopher Mahoney
(74) *Attorney, Agent, or Firm*—Fulbright & Jaworski LLP

(57) ABSTRACT

A projection device is provide, including a projection module having at least an optical lens, the projection module receiving data and converting display data into an optical image to be projected on a display area by the optical lens. The projection device can be positioned substantially close to the display area. This allows the projection device to directly project the optical image on the display area without having to adjust a projection angle, and also makes the projected image free of obstruction from movement of a user. Therefore, data display and projection operation can be conveniently and efficiently implemented.

15 Claims, 7 Drawing Sheets

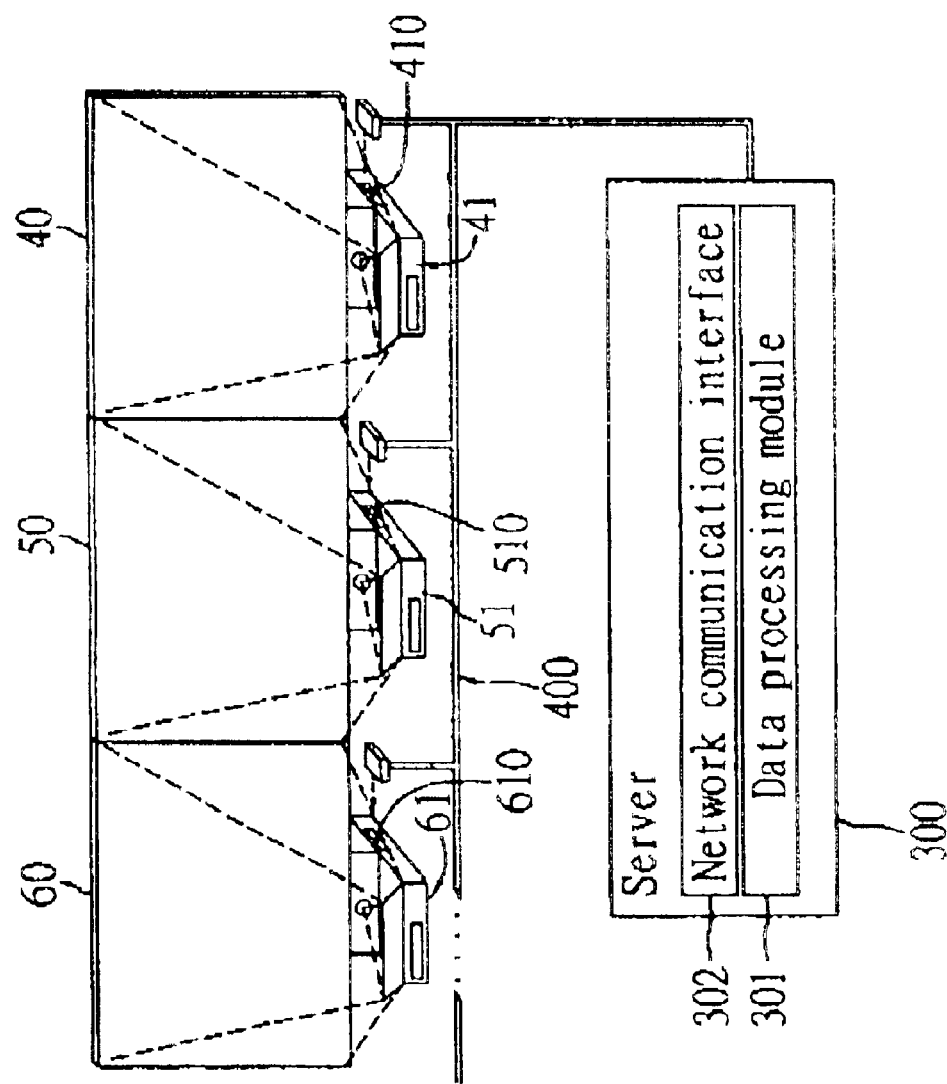

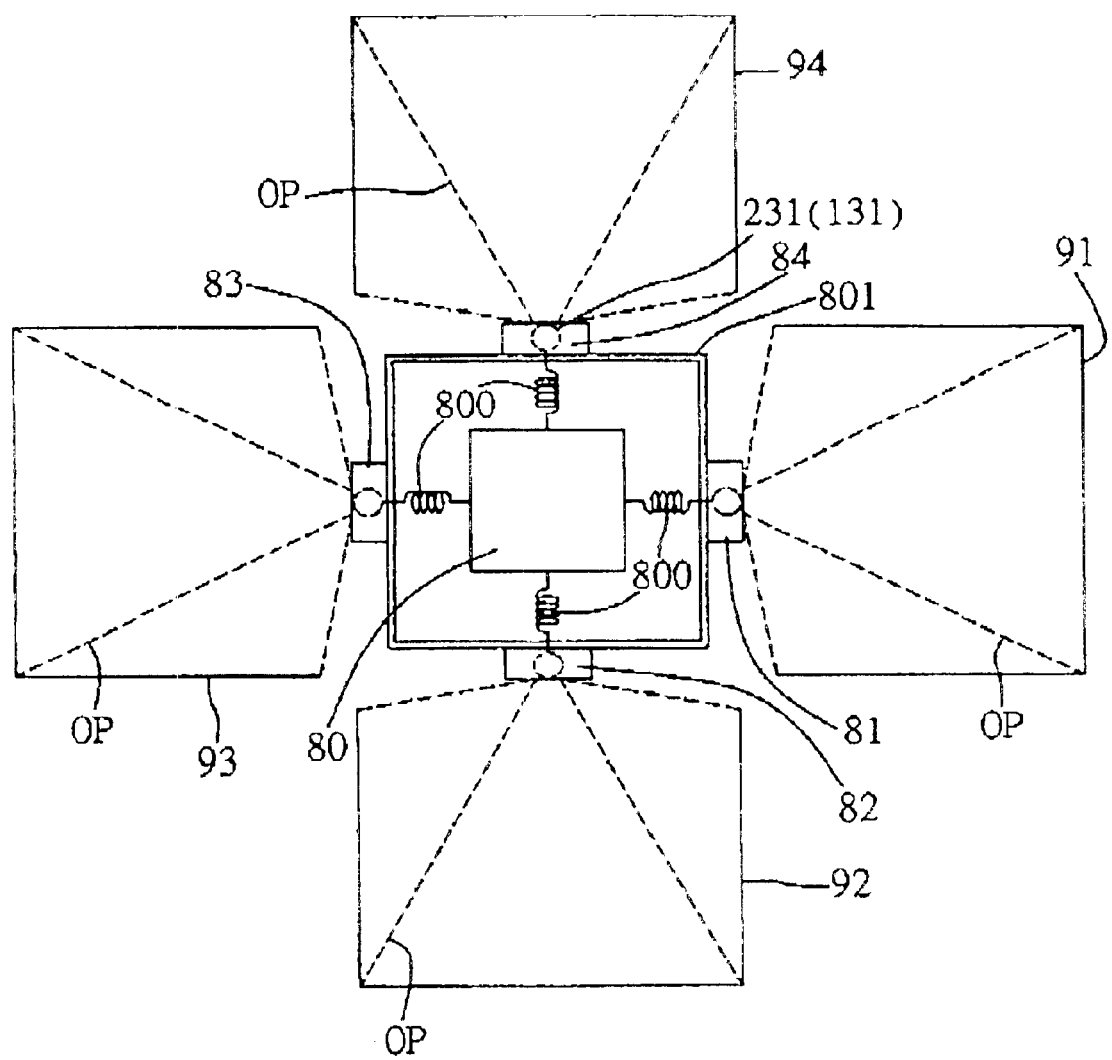

PROJECTION DEVICE

FIELD OF THE INVENTION

The present invention relates to image projecting technology, and more particularly, to a projection device for projecting an image on an intended display area.

BACKGROUND OF THE INVENTION

Conventional projectors such as over head projector, slide projector, CRT (cathode-ray tube) projector, LCD (liquid crystal display) panel, DLP (digital light processing) projector, and so on are used to project text and/or images on a display area or panel for allowing more people to simultaneously view the text and/or images. An advanced projector can be connected to a notebook computer or a desktop computer, allowing data processed from the computer to be projected by the projectors without having to print out data on papers and thus free of concern that data may be unclearly shown on the papers and degrade quality of projection.

The foregoing projector can further be connected to a digitizing tablet which is a digital input board with a touch-sensitive surface on which a user may write with a touch pen. Moreover, the digitizing tablet can be connected to a computer by which text written on the digitizing tablet is converted via recognition software into readable data for the computer or user, or printed out by a printer connected to the computer. This also allows the projector to project an image displayed on a screen of the computer onto the digitizing tablet, whereby the user can use the touch pen as a pointing device to operate application programs executed by the computer.

FIG. 1 illustrates a connection structure of a digitizing tablet and a computer, which includes a digitizing tablet 10, a computer 20, and a projector 30.

The digitizing tablet 10 allows a user to write thereon with a touch pen 12 and accordingly generates associated pixel coordinate data to be sent to the computer 20 via a connection interface 11 such as a wired RS-232 interface or a wireless IrDA (infrared data association) interface. The computer 20 converts the pixel coordinate data into data readable for the computer or user, or prints out data via a printer (not shown) connected thereto.

The computer 207 such as a desktop computer or a notebook computer, is connected to the digitizing tablet 10 via the connection interface 11, for receiving and converting the pixel coordinate data from the digitizing tablet 10 into associated images or operating commands.

The projector 30 converts an image displayed by the computer 20 into an optical image and projects the optical image on the digitizing tablet 10. Thereby, the user may use the touch pen 12 as a pointing pen to select various operational functions displayed on the digitizing tablet 10.

However, in practice, the connection structure of the projector, digitizing tablet and computer renders the following disadvantages. It requires external cables for connecting the computer 20 and projector 30, besides, if the connection interface 11 is a wired RS-232 interface, more cables are used to connect the computer 20 and digitizing tablet 10. The use of cables undesirably makes the connection structure relatively messy in appearance. Furthermore, the user needs to adjust a projection angle of the projector 30 to align the projected image onto a projection screen for each time of operation, making the projection operation fairly time-ineffective to implement. In addition, movement of the user e.g. a speaker may easily interfere with the projected image on the projection screen, which would adversely affect attention of the audience or viewers and degrade quality of the image display.

SUMMARY OF THE INVENTION

An objective of the present invention is to provide a projection device by which projected data would not be affected from movement of a user.

Another objective of the invention is to provide a projection device by which the user does not need to adjust a projection angle of the projection device.

In order to achieve the foregoing and other objectives, the present invention proposes a projection device, including a projection module having at least an optical lens, the projection module receiving and converting display data into an optical image to be projected on a display area by the optical lens.

In another embodiment, the projection device further includes an optical reflector which is used to reflect the optical image projected from the optical lens on the display area.

In a further embodiment, the projection device further includes a computer for processing and converting data into display data, wherein the computer is connected to the projection module and sends the display data to the projection module.

In a further embodiment, the computer further includes at least one communication interface connected to a peripheral device such as a scanner, a digital camera, a slide projector, or a device capable of outputting display data, so as to allow the projection device with the computer to receive display data from he peripheral device and convert the display data into an optical image for display.

The projection device according to the invention provides significant benefits, which can be placed closer to a display area and connected to an electronic device for processing or storing data of sounds or images. In particular, this projection device is positioned to allow a projected image to be free of obstruction from movement of a user, and is connected to a computer for allowing display of the projected image through the use of the projection device and computer without having to adjust a projection angle via the user.

BRIEF DESCRIPTION OF THE DRAWINGS

The present invention can be more fully understood by reading the following detailed description of the preferred embodiments, with reference made to the accompanying drawings, wherein:

FIG. 5 is a schematic diagram of the projection device according to a fourth preferred embodiment of the invention;

FIG. 7 is a schematic diagram of the projection device according to a sixth preferred embodiment of the invention.

DETAILED DESCRIPTION OF THE PREFERRED EMBODIMENTS

Preferred embodiments of a projection device proposed in the present invention are described in detail with reference to FIGS. 2–7.

First Preferred Embodiment

Figure 1:
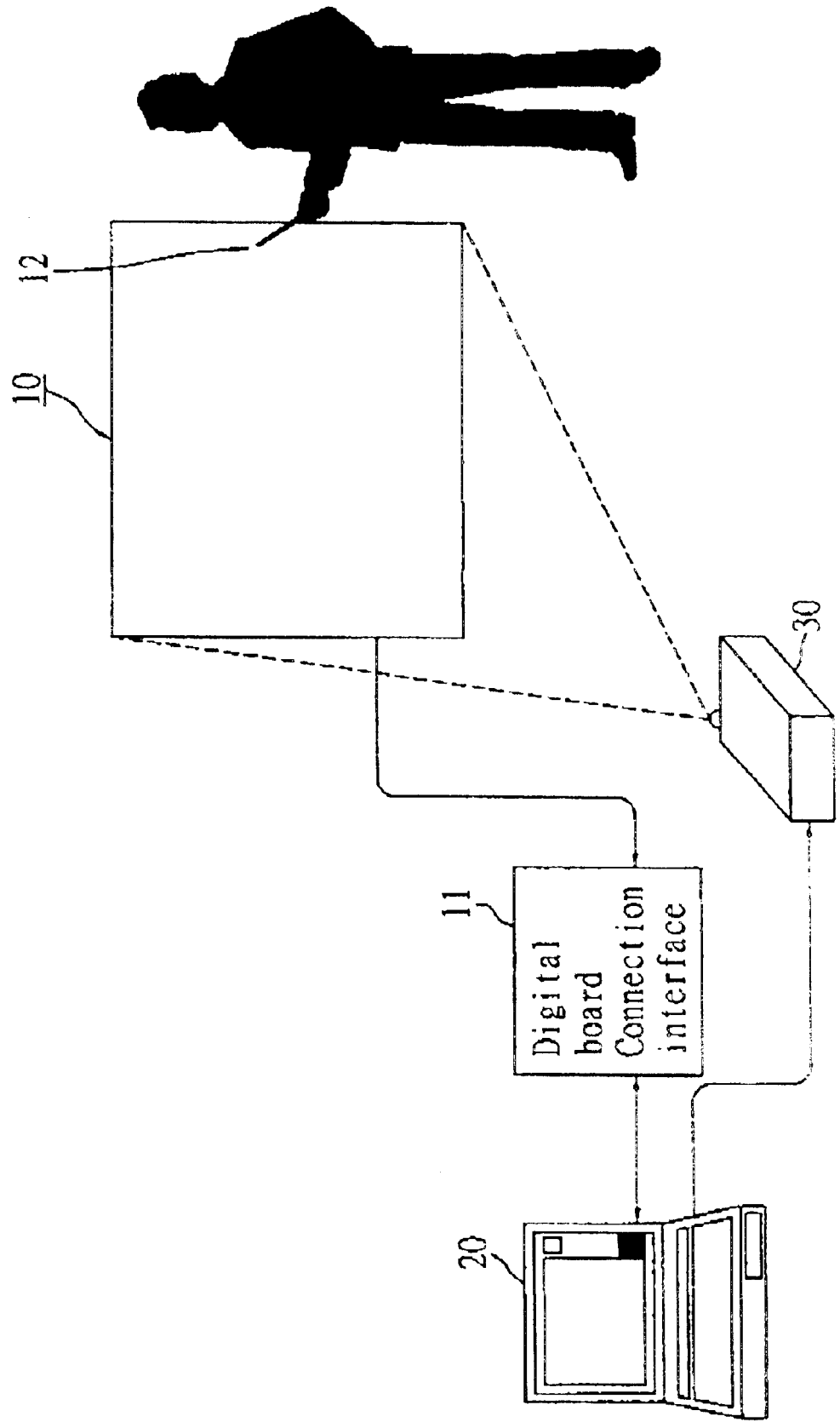
FIG. 1 (PRIOR ART) is a schematic diagram showing a conventional connection structure of a projection device.
Figure 2B:
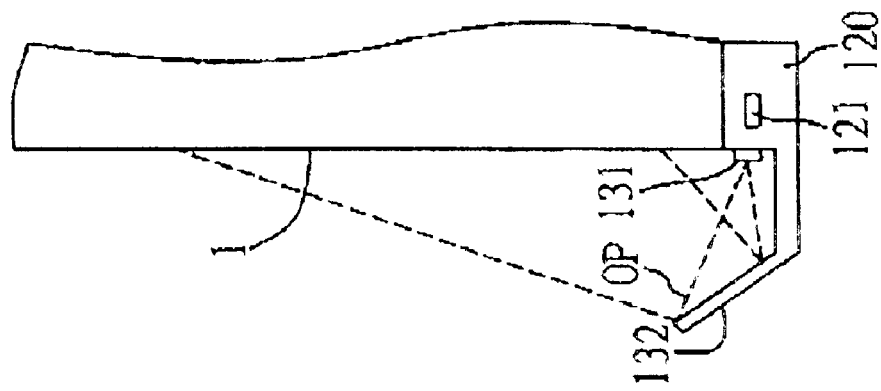
FIGS. 2A and 2B are respectively a front view and a side view of a projection device according to a first preferred embodiment of the invention.
Figure 2A:
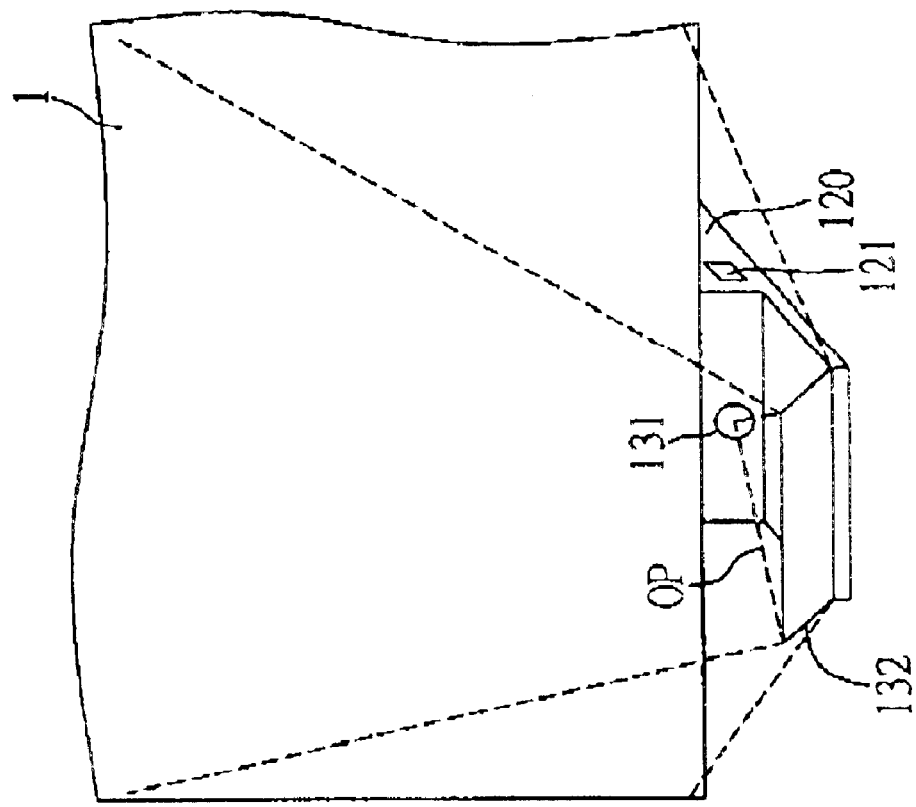

FIGS. 2A and 2B illustrate front and side views of a projection device according to a first preferred embodiment of the invention. As shown in the drawings, this projection device having a projection module 120 is installed on a bottom side of a display area 1 for displaying an optical image. The projection device comprises at least one projection module 120. It should be understood that the projection device may alternatively be mounted on a left, right or top side of the display area 1 depending on practical requirements. The display area 1 can be a wall, a whiteboard, a digitizing tablet, or any other suitable surface for image display.

In this embodiment, the projection module 120 has a communication interface 121, an optical lens 131 (having at least a convex lens) with an optic axis directed toward a same direction as the display area 1, and an optical reflector 132 formed on the optic axis of the optical lens 131. The projection module 120 can be connected via the communication interface 121 (e.g. USB, RS-232, PS/2, etc.) to an external data processing device (not shown) capable of outputting display data such as a computer, scanner, digital camera and so on. This allows the projection module 120 to convert the display data (e.g. a VGA image) from the data processing device into an optical image which is then projected from the optical lens 131 along a predetermined direction and reflected on the display area 1 by the optical reflector 132.

In practice, if a user intends to display data on the display area 1, he or she only needs to operate the projection module 120 to download and convert the VGA image into an optical image that can then be projected and reflected on the display area 1.

In the use of the projection device according to the invention, the user may optionally install the projection device significantly closer to the display area 1 than is feasible with the prior art or on any side of the display area 1. Since the display area 1 and the projection device are closely arranged with considerably small or even no space therebetween, movement of users or viewer would not obstruct the projected image.

Second Preferred Embodiment

Figure 3A:
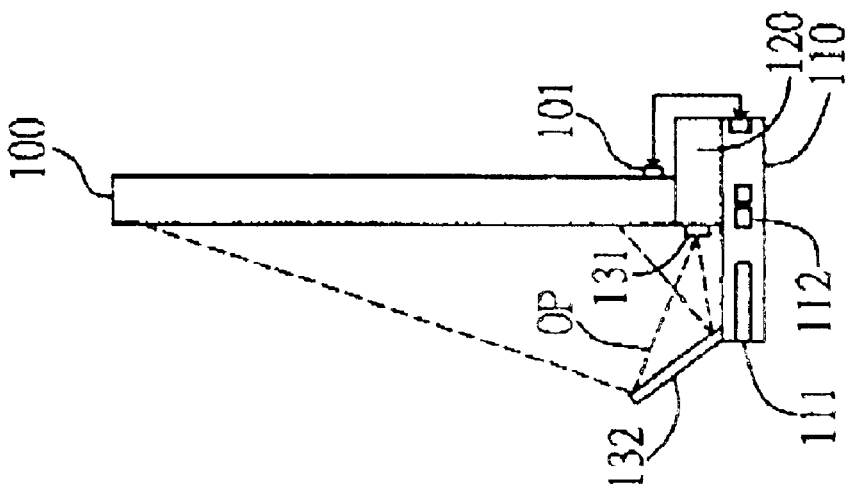
FIGS. 3A and 3B are respectively a front view and a side view of the projection device according to a second preferred embodiment of the invention.
Figure 3B:
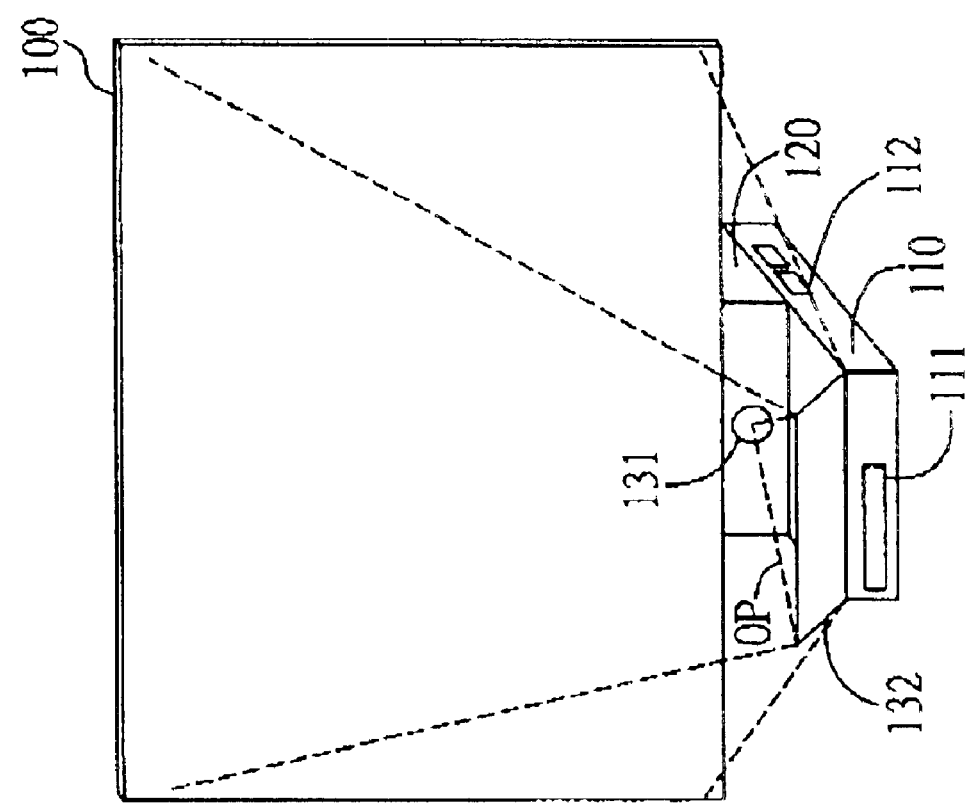

FIGS. 3A and 3B illustrate front and side views of the projection device according to a second preferred embodiment of the invention. As shown in the drawings, this projection device is connected to a digitizing tablet 100, and at least includes a computer 110 and a projection module 120.

The digitizing tablet 100 has a connection interface 101, such as a standard wired RS-232 interface, for connecting the digitizing tablet 100 to the computer 110. characteristic feature of the invention is to use internal circuits for the connection between the digitizing tablet 100 and the computer 110, thereby not having to use inconvenient external cables.

The computer 110 is a data processing module such as a RISC (reduced instruction set computing) unit which can execute various data processing functions, for example to process data to be displayed on the digitizing tablet 100. Furthermore, the computer 110 can be further formed with a data storage unit 111 (such as DVD-ROM drive, CD-ROM drive, hard disk drive, floppy disk drive, etc.) and a communication interface 112 (such as USB. RS-232, PS/2, etc.). The data storage unit 111 is used to store data to be displayed by the computer 100 and data downloaded from the digitizing tablet 100. The communication interface 112 is used to connect the computer 110 to an external peripheral device or another computer (not shown), for allowing the user to store data in the peripheral device or another computer.

In this embodiment, the projection module 120 has an optical lens 131 and an optical reflector 132, and is connected to the computer 110. This allows the projection module 120 to convert display data (such as a VGA image) from the computer 110 into an optical image which is then projected from the optical lens 131 along a predetermined direction and reflected on the digitizing tablet 100 by the optical reflector 132.

The computer 110 further includes a TV tuner interface built on an expansion card such as a TV card for providing a channel selection function, and thus the projection module 120 can project an input TV signal onto the digitizing tablet 100 or the display area 1.

Third Preferred Embodiment

Figure 4B:
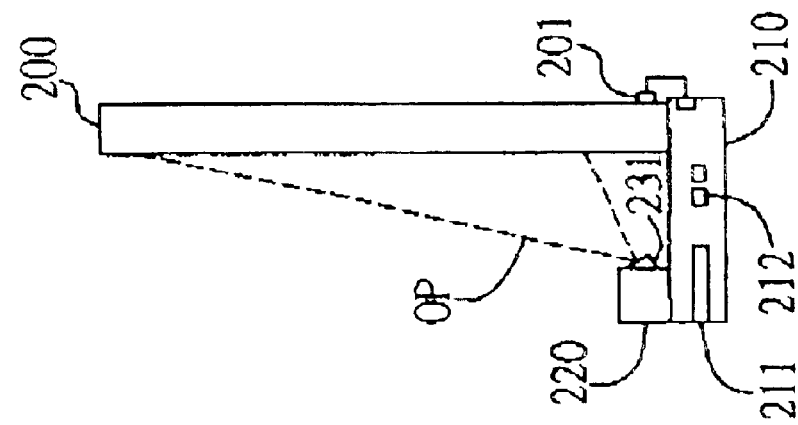
FIGS. 4A and 4B are respectively a front view and a side view of the projection device according to a third preferred embodiment of the invention.
Figure 4A:
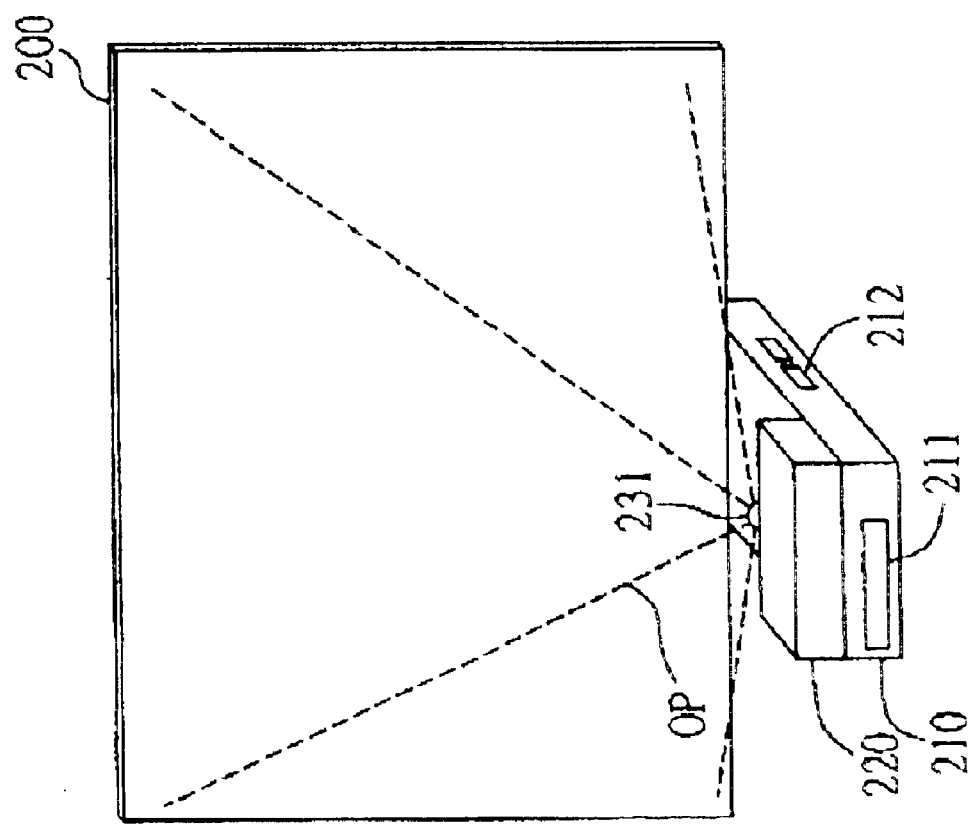

FIGS. 4A and 4B illustrate front and side views of the projection device according to a third preferred embodiment of the invention. This projection device is connected to a digitizing tablet 200, and at least includes a computer 210 and a projection module 220.

Similarly to the above second preferred embodiment, the digitizing tablet 200 may have a connection interface 201 for connecting the digitizing tablet 200 to the computer 210, and may further include a data storage unit 211 (such as DVD-ROM drive, CD-ROM drive, hard disk drive, floppy disk drive, etc.) and a communication interface 212 (such as USB, RS-232, PS/2, etc.).

A characteristic feature of this embodiment is that the projection module 220 has an optical lens 231 only but not with an optical reflector, wherein an optic axis of the optical lens 231 is directed at a predetermined angle toward the digitizing tablet 200, so as to allow an optical image to be directly projected by the optical lens 231 on the digitizing tablet 200.

In addition, beside the digitizing tablet, the projection device according to the second and third embodiments is also operable together with a common projection screen, such as a wall, whiteboard, curtain screen, etc. And, the projection device can be also applied to a home theater, presentation panel, indoor or outdoor billboard, or aircraft in-flight system.

Fourth Preferred Embodiment

FIG. 5 illustrates the projection device according to a fourth preferred embodiment of the invention. In this embodiment, a plurality of projection devices (41, 51, 61, . . . ) are each mounted on a side of a corresponding projection screen (40, 50, 60, . . . ). A plurality of communication interfaces (410, 510, 610, . . . ) formed with the projection devices (41, 51, 61 . . . ) are connected to a server 300 via a network transmission system 400 (such as intranet). The server 300 has a data processing module 301 and a network communication interface 302. The network communication interface 302 is used to integrate and manage data flows for the projection devices (41, 5161, . . . ). The data processing module 301 is used to control display processing functions of the projection devices (41, 51, 61, . . . ), for example to provide respective displays on multiple windows, a single display on all multiple windows, or variable displayed on different combinations of multiple windows, etc.

The above arrangement thereby allows a display with larger area such as a blackboard, or multiple data displays such as financial or stock market displays. Further, the projection devices (41, 51, 61, . . . ) may individually or simultaneously be connected to a network (such as Internet) via a hub for reading and displaying data.

Fifth Preferred Embodiment

Figure 6:
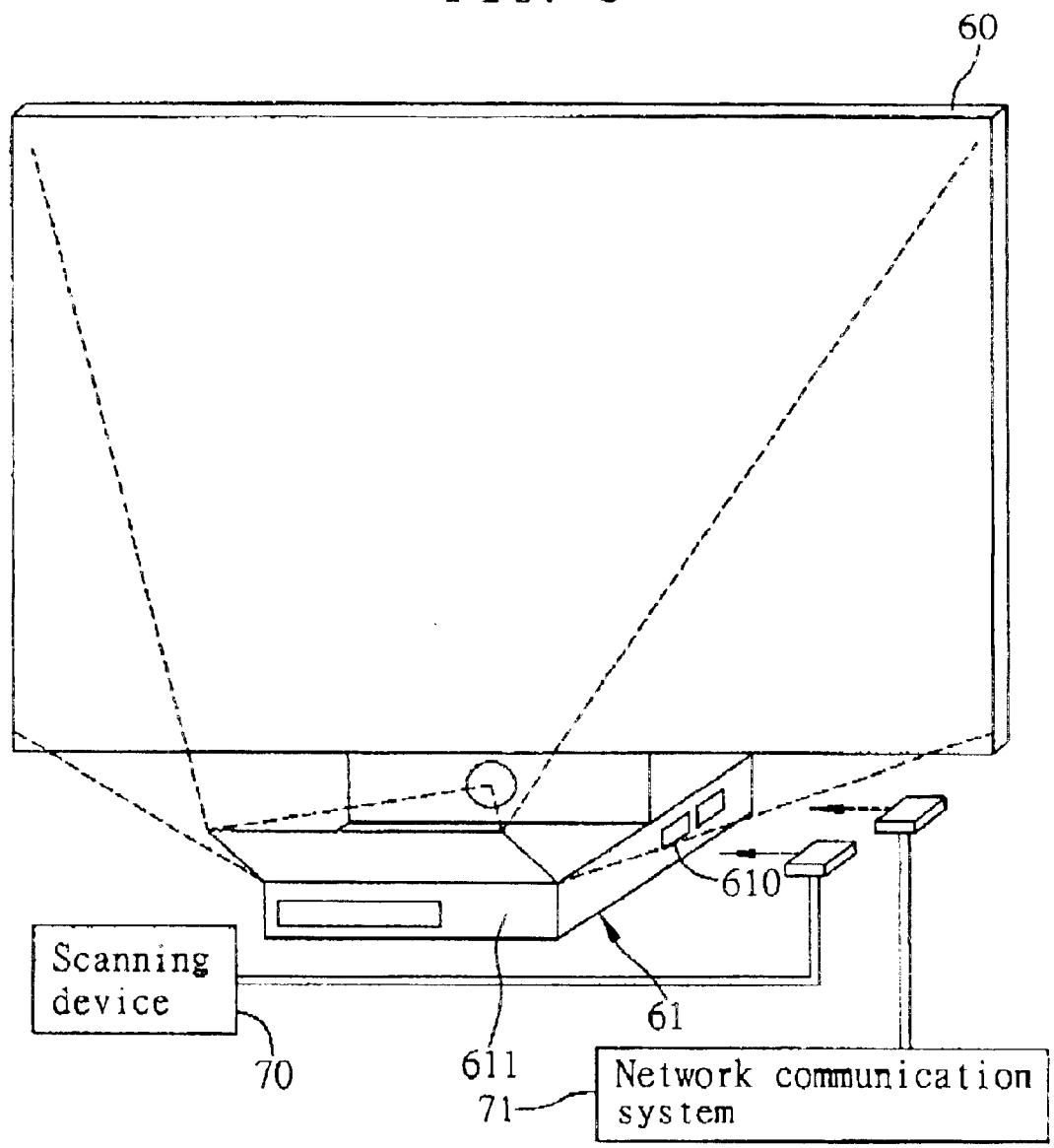
FIG. 6 is a schematic diagram of the projection device according to a fifth preferred embodiment of the invention.

FIG. 6 illustrates the projection device according to a fifth preferred embodiment of the invention. This projection device 61 is mounted on a side of a projection screen 60 (such as a digitizing tablet, wall, panel, etc.) and connected to a scanning device 70 via a communication interface 610 thereof. This allows data intended for display to be scanned by the scanning device 70 and inputted via the communication interface 610 to a computer 611 installed with the projection device 61 where the data are processed to be projected on the projection screen 60. The computer 611 may also include a set of control software with a scanning function to process the data from the scanning device 70 for being stored in the computer 611 or for being directly displayed on the projection screen 60.

Moreover, the projection device 61 can be connected via the communication interface 610 to a network communication system 71 such as Internet, and operate with an electronic device having a headphone and speaker to perform web-phone communication.

Sixth Preferred Embodiment

FIG. 7 illustrates the projection device according to a sixth preferred embodiment of the invention. In this embodiment, four of the projection devices (81, 82, 83, 84) are installed on a frame 801, each of which is connected to a computer 80 that is used to control a display processing function of the projection devices (81, 82, 83, 84) via a data transmission wire 800. The computer 80 may be further connected to an external keyboard (not shown) by which a user can input a control signal to control the display processing function, for example to provide respective displays on multiple windows, a single display on all multiple windows, or variable displayed on different combinations of multiple windows, etc. Moreover, each of the projection devices (81, 82, 83, 84) may be formed with a pair of rollers (not shown) to enable the computer 80 to position the projection devices (81, 82, 83, 84) respectively with respect to the frame 801. In this manner, display areas (92, 92, 93, 94) respective for the projection devices (81, 82, 83, 84) can be flexibly modulated to achieve desirable display effect, each of which can be a wall, ceiling, the ground, or any other suitable surface.

The number of projection device mounted on the frame is not limited to four illustrated in FIG. 7 but can be flexibly adjusted according to practical requirements. The projection device according to the invention may also mounted on a rear side of a light-permeable display panel (not shown), such as a curtain screen, glass board, or plastic board, to thereby serve as a rear projection device.

Moreover, the projection device according to the invention uses an image processor IC (integrated circuit) to integrate signals from processing circuits such as RGB (red-green-blue) generator circuits, image decoder circuits, analog-to-digital converter, phase lock loops (PLL), and frame registers. Then, the integrated signals are outputted via a control IC to an optical lens of the projection device, wherein the output signals from the control IC are adjusted by an OSD controller.

A characteristic feature of the projection device according to the invention is to allow a user to perform short-distance image projection. For preventing image deformation by short-distance projection, the projection device needs to implement the following procedures, including a real-time geometry process, an advanced image process, a process for brightness, contrast, hue and saturation control (i.e. high quality image output), a process for two-dimensional off-axis projection (keystone correction), and a high quality de-interlacing process. By these procedures and the above associated hardware circuits, the projection device according to the invention can adequately eliminate deformation of projected images due to an inclined projection angle to provide satisfactory projection effect as a normal front- or rear-projection device.

Therefore, the projection device according to the invention provides significant benefits, which can be placed closer to a display area and connected to an electronic device for processing or storing data of sounds or images. In particular, this projection device is positioned to allow a projected image to be free of obstruction from movement of a user, and is connected to a computer for allowing display of the projected image through the use of the projection device and computer without having to adjust a projection angle via the user.

The invention has been described using exemplary preferred embodiments. However, it is to be understood that the scope of the invention is not limited to the disclosed embodiments. On the contrary, the scope claims should be accorded the broadest interpretation so as to encompass all such modifications and similar arrangements.

What is claimed is:

1. A projection device comprising a projection module having at least an optical lens, the projection module managed for receiving and converting display data into an optical image to be projected on a display area by the optical lens, wherein an optic axis of the optical lens is directed toward a same direction as the display area and the projection device is connected to the display area without any external cables such that the projecting device is positioned so adjacent to the display area that a user is prevented from obstructing an image projection.

2. The projection device of claim 1, further comprising a computer connected with the projection module, for processing and converting data into the display data.

3. The projection device of claim 2, further comprising at least one communication interface for receiving the display data from the computer.

4. The projection device of claim 2, further comprising at least one communication interface connected to an external peripheral device, for downloading data to be displayed on the display area.

5. The projection device of claim 2, wherein the computer is connected to a digitizing tablet by an internal circuit.

6. The projection device of claim 1, wherein the projection module further comprises an optical reflector formed on the optic axis of the optical lens, for reflecting the optical image from the optical lens on the display area.

7. The projection device of claim 6, further comprising a data storage unit for storing data to be displayed on the display area.

8. The projection device of claim 1, wherein the optical lens is directed toward the display area to project the optical image on the display area.

9. The projection device of claim 8, further comprising a data storage unit for storing data to be displayed on the display area.

10. The projection device of claim 1, further comprising a data storage unit for storing data to be displayed on the display area.

11. A projection device, comprising:

a computer for processing and converting data into display data wherein the computer is connected to a digitizing tablet by a network communication interface; and a projection module having at least an optical lens and an optical reflector, the projection module being connected to the computer for converting the display data from the computer into an optical image, and for projecting the optical image on the digitizing tablet via the optical lens, wherein an optical axis of the optical lens is directed toward a same direction as the digitizing tablet, such that the projecting device is so adjacent to the digitizing table that a user is prevented from obstructing an image projection.

12. The projection device of claim 11, wherein the optical reflector is formed on the optic axis of the optical lens, for reflecting the optical image from the optical lens on the display area.

13. The projection device of claim 11, further comprising at least one communication interface connected to an external peripheral device, for downloading data to be displayed on the display area.

14. The projection device of claim 11, further comprising a data storage unit for storing data to be displayed on the display area.

15. The projection device of claim 11, wherein the computer is connected to a digitizing tablet by a network communication interface.

* * * * *